United States Patent [19]
Fox et al.

[11] Patent Number: 5,849,674
[45] Date of Patent: Dec. 15, 1998

[54] COMPOSITIONS AND PROCESSES FOR OIL FIELD APPLICATIONS

[75] Inventors: Kelly B. Fox; Ahmad Moradi-Araghi; Donald D. Bruning; David R. Zornes, all of Bartlesville, Okla.

[73] Assignee: Phillips Petroleum Company, Bartlesville, Okla.

[21] Appl. No.: 732,570

[22] Filed: Oct. 15, 1996

[51] Int. Cl.[6] ........................... C09K 7/02
[52] U.S. Cl. .................. 507/140; 507/110; 507/111; 507/112; 507/113; 507/114; 507/115; 507/119; 507/120; 507/121; 507/213; 507/214; 507/215; 507/216; 507/225; 507/228; 507/269; 507/271; 507/903
[58] Field of Search ...................... 507/110, 111, 507/112, 113, 114, 115, 119, 120, 121, 140, 269, 271, 903, 213, 214, 215, 216, 225, 228

[56] References Cited

U.S. PATENT DOCUMENTS

| | | | |
|---|---|---|---|
| 3,727,688 | 4/1973 | Clampitt | 166/283 |
| 3,818,998 | 6/1974 | Hessert | 175/72 |
| 3,909,423 | 9/1975 | Hessert et al. | 252/8.55 D |
| 4,076,628 | 2/1978 | Clampitt | 252/8.5 C |
| 4,257,903 | 3/1981 | Kucera et al. | 252/8.5 C |
| 4,547,298 | 10/1985 | Novak | 507/140 |
| 4,644,713 | 2/1987 | Almond et al. | 106/209 |
| 4,655,942 | 4/1987 | Pickert, Jr. et al. | 507/140 |
| 4,676,930 | 6/1987 | Shu et al. | 252/315.3 |
| 4,683,949 | 8/1987 | Sydansk et al. | 166/270 |
| 4,706,754 | 11/1987 | Smith | 166/295 |
| 4,724,906 | 2/1988 | Sydansk | 166/295 |
| 4,730,674 | 3/1988 | Burdge et al. | 166/295 |
| 4,744,418 | 5/1988 | Sydansk | 166/270 |
| 4,844,168 | 7/1989 | Sydansk | 166/270 |
| 4,917,186 | 4/1990 | Mumallah | 166/295 |
| 4,921,621 | 5/1990 | Costello et al. | 507/120 |
| 4,941,981 | 7/1990 | Perricone et al. | 252/8.51 |
| 4,957,166 | 9/1990 | Sydansk | 166/295 |
| 4,989,673 | 2/1991 | Sydansk | 507/140 |
| 5,032,295 | 7/1991 | Matz et al. | 507/119 |
| 5,069,281 | 12/1991 | Tackett, Jr. | 166/295 |
| 5,082,057 | 1/1992 | Sydansk | 166/295 |
| 5,131,469 | 7/1992 | Lockart et al. | 166/295 |
| 5,132,029 | 7/1992 | Lockart et al. | 252/8.551 |
| 5,358,043 | 10/1994 | Moradi-Araghi | 166/270 |
| 5,362,415 | 11/1994 | Egraz et al. | 507/119 |
| 5,658,859 | 8/1997 | Burba, III et al. | 507/111 |

*Primary Examiner*—Philip Tucker
*Attorney, Agent, or Firm*—Lucas K. Shay

[57] ABSTRACT

A composition and a process for treating a subterranean formation are disclosed. The process comprises injecting into the subterranean formation a composition which comprises a polymer, a crosslinking agent, a liquid, optionally a clay, and further optionally a weighting agent wherein the polymer forms a gel in the formation, in the presence of the crosslinking agent.

39 Claims, 5 Drawing Sheets

COMPOSITIONS AND PROCESSES FOR OIL FIELD APPLICATIONS

FIELD OF THE INVENTION

The present invention relates to a composition and a process useful for oil field operations.

BACKGROUND OF THE INVENTION

During drilling operations, large flow channels such as, for example, fractures, joints, and voids around wellbore, whether induced or natural, can cause various problems during drilling, or completion, operations. Such problems can include substantial loss of fluids from the wellbore. Any of these results in the loss of hydrostatic head, with the subsequent potential for loosing control of the well. It can also lead to damage of the production capacity of oil and gas zones, when those channels represent a portion of the drainage pattern.

Various methods could be used in the attempt to control the loss of drilling fluid of these channels, fractures, joints, or voids. For example, incorporating solids such as paper, mica flakes, and/or cloth fibers into the drilling fluid has been used. However, these methods are not always effective because the solids may be lost in these channels. Therefore, there is an increasing need to develop a process for controlling the loss of drilling fluids. One such process is to employ a mud gel as disclosed hereinbelow in this invention. Such a process can crosslink either at the surface, during placement, or in-situ a gelling composition. In many applications, the placement of a gel can be sufficient to prevent further invasion by the drilling fluids. In some instance, however, hydraulic forces may lead to dehydration, channeling, or even extrusion, of a gel. This could be due to the relatively large surface area of gel that is exposed to the wellbore fluids, and to the relatively small surface area, within the channels, fractures, joints, or voids, that is available for adhesion. This situation can be corrected by incorporating solids such as, for example, sand, calcium carbonate, and commercially available lost circulation materials into the gel. Such incorporation can effectively create a porous matrix within the channel, thus dramatically increasing surface area for adhesion and reducing cross sectional area of the exposed gel.

Similarly, fractures can also occur in an injection well, a producing well, or both. A similar process can also be employed. In order to correct sweep profile encountered in fractured reservoirs, large volumes of gellable polymer solutions can be used to plug the fractures. The effectiveness of these treatments are sometimes adversely affected by hydraulic failure of the gel near the wellbore. Again, incorporation of sand, or other suitable solid, as an artificial matrix within the fracture can also considerably enhance the mechanical properties of the gel plug, probably by reducing exposed surface area in the gel and increasing the adhesive capabilities of the gel.

Destablization of the sea bed is commonly encountered while drilling in some areas offshore. As drill bit progresses down through the sediment, circulating drilling fluid will sometimes wash out the unconsolidated sediment around the wellbore. In extreme, but not uncommon, cases a channel may develop which bypasses the wellbore altogether. It has been reported that undersea cameras recorded large mounds of sediment, offset from the wellbore, which was deposited by circulating drilling fluid. This undermining of the sea bed causes considerable concern because of the proximity of the drilling platform. Even after the drilling operation is complete and casing is set, these poorly to fully unconsolidated sediments can pose serious concerns. Though a very rigid structure around the wellbore, such as a resinous system could be used, such a structure might not provide the needed protection, especially at low temperature close to sea bed which could be as cold as 35° C. Again, there is an ever-increasing need for developing a process for stabilizing such an unconsolidated settlement.

Problems also encountered during drilling of a subsalt well. One of the problems encountered is a very unstable matrix with high fluid pressure which releases gas into the drill stem. This requires halting the drilling and separating the gas due to safety concerns. A gelling system with very low molecular weight polyacrylamide and a crosslinking agent can be injected into the unstable matrix described above and set in place to block additional gas release into the wellbore. Another problem frequently encountered during drilling of a subsalt well is the presence of fractures which cause loss of circulation and halts drilling progress. A "mud gel" composition, as disclosed hereinbelow, produced with a mud, containing clays such as bentonite and weighting agent such as barite, which contains dissolved polymer and a crosslinking agent such as chromium propionate in its composition can be used.

In drilling of wells, a drilling fluid is generally circulated down the drill string and back up the annulus between the drill string and the wellbore face. A casing string or liner is then cemented into the wellbore. However, it has been widely reported that there are numerous annular leaks through the cement. Such oil or gas leaks through the cement contaminate the ground water causing further environmental problems. A gas leak through the cement out to the well surface can also represent a hazardous condition. Therefore, a process needs to be developed for preventing such annular leaks through the cement.

SUMMARY OF THE INVENTION

An object of the invention is to provide a process for sand consolidation in a subterranean formation. Also an object of the invention is to provide a process for plugging an annular flow of gas, oil, water, or combinations of two or more thereof through defects in cement in a production well. Another object of the invention is to provide a process for treating a subterranean formation at low temperature by using a gelling composition. Still another object of the invention is to provide a process for preventing the loss of drilling fluid. A further object of the invention is to provide a process for plugging fractures in subterranean formation with a gelling composition. Still a further object of the invention is to provide a process for wellbore treatment employing a gelling composition that is suitable for low temperature operations. Yet another object of this invention is to develop integrity in the sediments surrounding the wellbore by placing a gelling composition in the formation. Yet still a further object of the invention is to develop a process which is to place the gel periodically during the drilling operation in order to prevent these problems from occurring or reoccurring. Other objects, features, and advantages will become more apparent as the invention is more fully disclosed hereinbelow.

According to a first embodiment of the present invention, a composition which can be used in a water-based fluid for applications in a subterranean formation is provided which comprises a clay, a gelling mixture, a liquid, and optionally a weighting agent wherein the gelling mixture comprises a polymer and a crosslinking agent.

According to a second embodiment of the invention, a process which can be used in drilling a subterranean formation is provided. The process comprises injecting a composition into a subterranean formation during drilling operation wherein the composition can be the same as that disclosed in the first embodiment of the invention.

According to a third embodiment of the invention, a process for settling unconsolidated sediments in a subterranean formation or around the surface of a wellbore in a low temperature environment is provided. The process can comprise, consist essentially of, or consist of, injecting a composition into the formation wherein the composition can be the same as that disclosed in the first embodiment of the invention.

Figure 1:
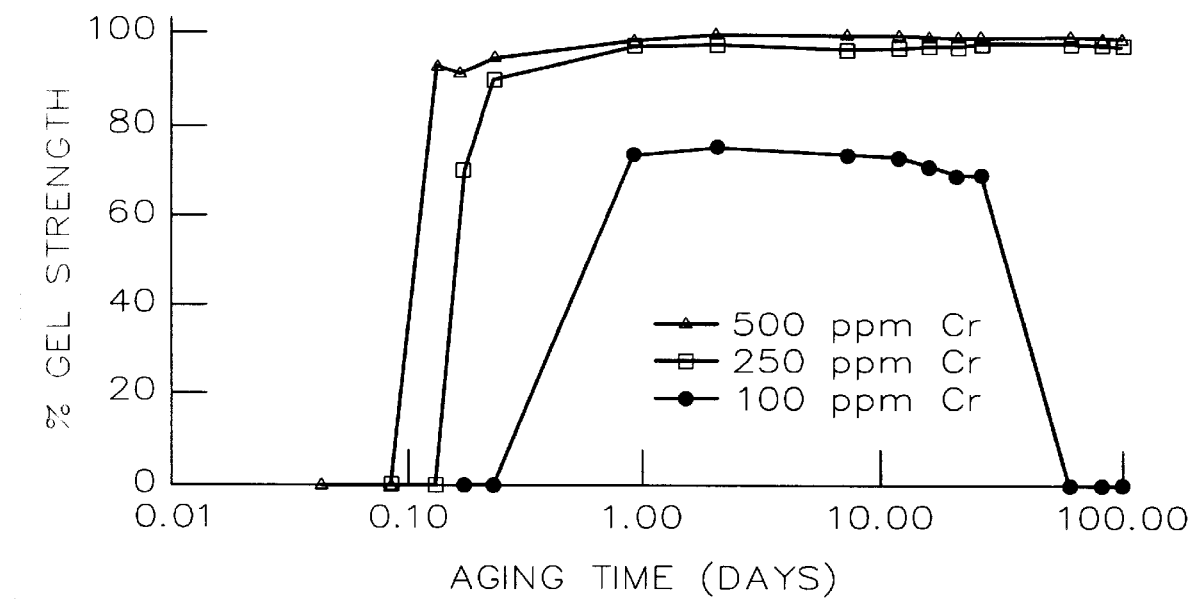
FIG. 1 is a plot of gel strength of gels formed by a gelling composition as a function of aging time at 130° F. in 26 weight % NaCl brine without pH adjustment.
Figure 2:
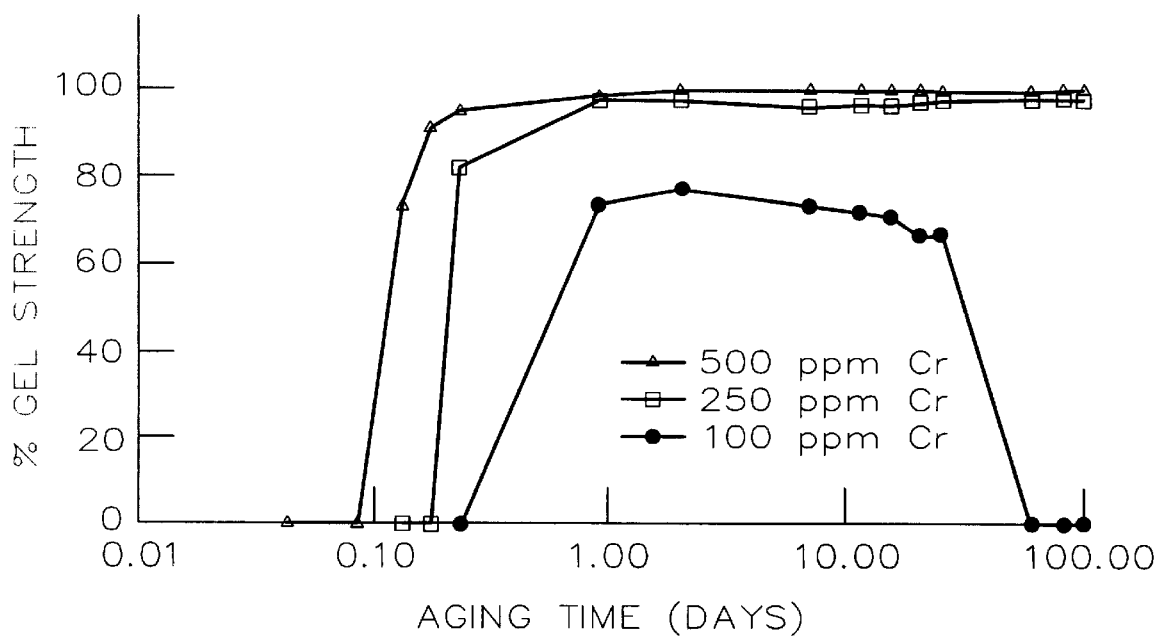
FIG. 2 is the same as FIG. 1 except that the pH of the gelling composition was adjusted to 9.0.
Figure 3:
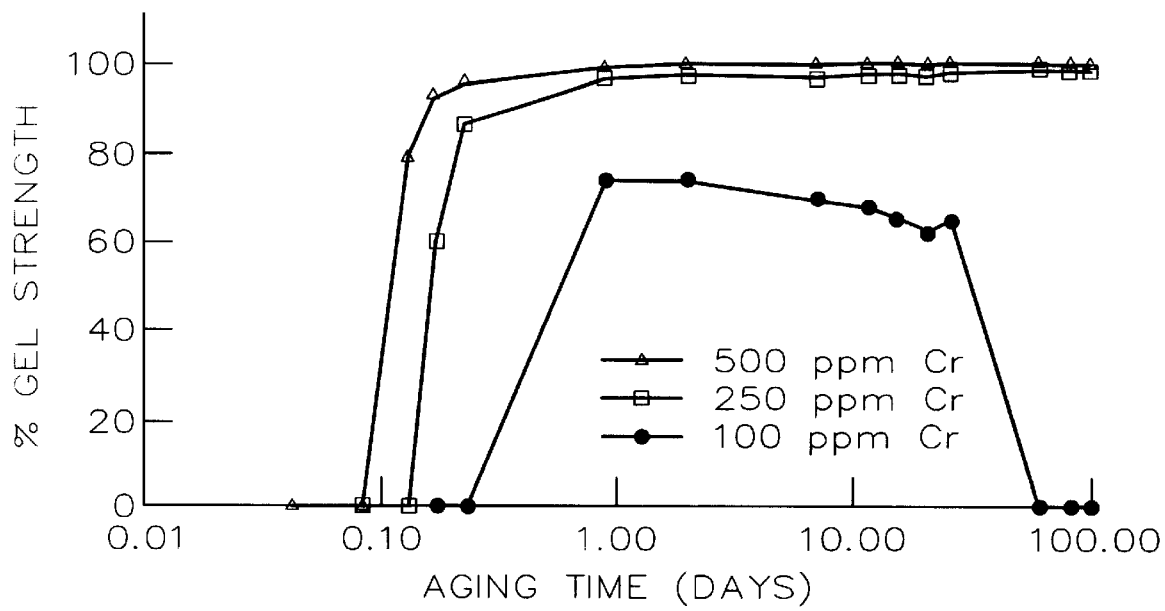
FIG. 3 is the same as FIG. 1 except that the pH of the gelling composition was adjusted to 10.5.

In these figures, the gels were formed from a low molecular weight of about 300,000 to 500,000 polyacrylamide, a chromium acetate or chromium propionate (obtained from Drilling Specialties Company, Bartlesville, Okla.) as a crosslinking agent, and a brine. The concentrations of the polymer and the crosslinking agent, measured as chromium, are shown in the Figures.

DETAILED DESCRIPTION OF THE INVENTION

The term "hydrocarbon" denotes any hydrocarbons which may or may not be oxygenated or substituted with appropriate substituents. The hydrocarbon may also contain minor components such as, for example, sulfur. The presently preferred hydrocarbons are crude oil and gas. An oil field application includes, but is not limited to, drilling, completion of drilling, production of hydrocarbons, permeability alteration, water coning correction, water shutoff, gas shutoff, zone abandonment, and combinations of any two or more thereof.

According to the first embodiment of the invention, a composition which can be used in an oil field application is provided. The composition can comprise, consist essentially of, or consist of a clay, a gelling mixture, and optionally a weighting agent. The clay useful in the invention can be any clay so long as the clay can viscosify a water- or oil-based fluid. Examples of suitable clays include, but are not limited to, kaolinite, halloysite, vermiculite, chlorite, attapulgite, smectite, montmorillonite, illite, saconite, sepiolite, palygorskite. Fuller's earth, and combinations of any two or more thereof. The presently preferred clay is montmorillonite clay. The presently most preferred clay is sodium montmorillonite, which is also known as bentonite. Based on the total weight % of the composition, the clay can be present in the composition in the range of from about 0.25 weight % to about 30 weight %, preferably about 0.5 weight % to about 25 weight %, and most preferably 1 weight % to 20 weight %.

Any known weighting agent that can be suspended in the composition can be used in the present invention. Examples of suitable weighting agents include, but are not limited to barite, hematite, calcium carbonate, galena, or combinations of any two or more thereof. The presently preferred weighting agent is barite for it is readily available and effective. The weighting agent can be present in the composition in the range of from about 5 to about 30, preferably about 8 to about 25, and most preferably 10 to 20 pounds per gallon.

According to the invention, any gelling mixture that can gel a clay-containing composition can be employed. Generally, a gelling composition comprises, consists essentially of, or consists of, a polymer and a crosslinking agent.

Any polymers that can form a mud gel when employed in the presence of a clay, a weighting agent, and a crosslinking agent can be used in the composition of the present invention. The presently preferred polymer is a carboxylate-containing polymer which can be crosslinked with a multivalent metallic compound.

The term "carboxylate-containing polymer" used herein refers to, unless otherwise indicated, a polymer that contains at least one free carboxylic group or a carboxylate group in which the proton of the carboxylic acid is substituted with an ammonium radical, an alkali metal, an alkaline earth metal, or combinations of any two or more thereof. As used herein, the term "copolymer" includes copolymer, terpolymer, or tetrapolymers.

According to the present invention, the molecular weight of the carboxylate-containing polymers can generally be at least about 10,000 and less than about 30,000,000, preferably less than about 25,000,000, and most preferably less than about 20,000,000. The mole percent (%) of the carboxylate group is generally in the range of from about 0.01 to less than about 30, preferably about 0.01 to less than about 20, and most preferably about 0.1 to about 10. However, if the molecular weight of a suitable polymer is about 1,000,000 or less, the mole % of the carboxylate group can be in the range of from about 0.01 to about 10%, preferably about 0.01 to about 10%, more preferably about 0.1 to about 5% and most preferably 0.1 to 1%.

According to the present invention, the gelation rate is defined as the rate at which gel particles are formed. At the onset of gelation these particles are small enough that the gelling solution still flows, but these particles can be detected from apparent flow characterization caused by the apparent viscosity change. The small particles grow to larger granules with time and become strong enough to hold fluids within their structures which restrict the free flowing characterizing of the gelling solution and thus, develop tongue length. The desired gelation rate varies depending on application. Applications illustrated in the present invention include, but are not limited to, plugging fractures or channels, preventing loss of circulation fluids, blocking gas release during drilling, or combinations of any two or more thereof. The gelation time is generally less than about 6 hours, preferably about 4 hours, more preferably about 3 hours, and most preferably 2 hours or shorter. Generally, no appreciable gel strength, as defined in Example I hereinbelow, is observed until a tongue length can be measured.

For example, if a loss of drilling fluid is detected, it is desirable to prevent such loss as soon as possible, and therefore, requires a gelation rate as short as possible but still long enough such that it can travel to the fracture, for example, before the composition of the invention becomes gel.

Carboxylate-containing polymers suitable for use in this invention are those capable of gelling in the presence of a crosslinking agent such as, for example, a multivalent metallic compound. Polymers suitable for use in this invention, i.e., those capable of gelling in the presence of a crosslinking agent, include, but are not limited to, biopolysaccharides, cellulose ethers, and acrylamide-containing polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and carboxymethyl cellulose (CMC) for their ready availability.

Suitable biopolysaccharides are disclosed in U.S. Pat. No. 4,068,714 (herein incorporated by reference). Particularly preferred is polysaccharide B-1459 and xanthan gums which are biopolysaccharides produced by the action of *Xanthomonas campestris* bacteria. This biopolysaccharide is commercially available in various grades under the tradenames of "KELZAN®" (Kelco Company, Los Angeles, Calif.), "FLOCON" 4800 (Pfizer, Groton, Conn.), and "FLOWZAN" (Drilling Specialties Company, Bartlesville, Okla.), and they are readily available.

Suitable acrylamide-containing polymers which also contain pendant carboxylate groups are disclosed in U.S. Pat. No. 3,749,172 (herein incorporated by reference). Particularly preferred are the so-called partially hydrolyzed polyacrylamides possessing pendant carboxylate groups through which crosslinking can take place. Polyacrylamides generally can become hydrolyzed under a subterranean formation condition to produce some crosslinkable carboxylate groups and thus can also be used in the present invention. Thermally stable carboxylate-containing polymers of acrylamide, partially hydrolyzed polyacrylamide, such as copolymers of N-vinyl-2-pyrrolidone and acrylamide; copolymers of sodium-2-acrylamido-2-methylpropanesulfonate, acrylamide, and N-vinyl-2-pyrrolidone; copolymers of N-vinyl-2-pyrrolidone and acrylamide, and sodium acrylate, copolymers of acrylamide, sodium-2-acrylamido-2-methylpropanesulfonate, and sodium acrylate; and copolymers of sodium-2-acrylamido-2-methylpropanesulfonate and acrylamide; copolymers of sodium-2-acrylamido-2-methylpropanesulfonate and acrylamide, and sodium acrylate; copolymers of sodium-2-acrylamido-2-methylpropanesulfonate, acrylamide, N-vinyl-2-pyrrolidone, and sodium acrylate; are particularly preferred for applications in high salinity environments at elevated temperatures for stability. Selected carboxylate-containing copolymers also are useful in the present process, such as copolymers derived from acrylamide, which is partially hydrolyzed to acrylate, and N-vinyl-2-pyrrolidone comonomers with lesser amounts of termonomers such as vinyl acetate, vinylpyridine, styrene, methyl methacrylate, and other polymers containing acrylate groups.

Generally, suitable polymers contain some carboxylate group if the polymers are used to crosslink with multivalent cations such as Cr cations, Zr cations, Ti cations, Fe cations, Al cations, or combinations of any two or more thereof. Any polymer that can be used to crosslink with an organic crosslinking agent can also be used in the present invention. An organic crosslinking agent can include, but is not limited to, phenol and formaldehyde, or precursors thereof, or furfuryl alcohol and formaldehyde, or an aminobenzoic acid and formaldehyde, or combinations of any two or more thereof. Precursors of formaldehyde such as, for example, hexamethylenetetramine can be, and are more preferably, used in place of formaldehyde. More detailed description of such crosslinking agents can be found in U.S. Pat. No. 's 5,399,269 and 5,480,933, disclosures of which are incorporated herein by reference.

Other miscellaneous polymers suitable for use in the present invention include partially hydrolyzed polyacrylonitriles, copolymers of acrylate and styrene sulfonate, or combinations of any two or more thereof.

Though any crosslinkable and gellable polymers can be used in the present invention, the presently preferred polymers are carboxylate-containing polymers which include CMHEC, CMC, xanthan gum, the acrylamide-containing polymers, or combinations of any two or more thereof. The presently particularly preferred polymers are partially hydrolyzed polyacrylamides, polymers containing acrylamide, ammonium or alkali metal salts of acrylic acid, and polymers containing ammonium or alkali metal salts of acrylic acid, N-vinyl-2-pyrrolidone, and sodium-2-acrylamido-2-methylpropanesulfonate. The ammonium or alkali metal salts of acrylic acid are herein referred to as acrylate, as in the claims.

Any crosslinking agents such as, for example, a multivalent metallic compound that are capable of crosslinking the gellable carboxylate-containing polymer in a subterranean formation can be used in the process of the present invention. The presently preferred multivalent metal compound is a metal compound selected from the group consisting of a complexed zirconium compound, a complexed titanium compound, and mixtures thereof. Examples of suitable multivalent metallic compounds include, but are not limited to, zirconium citrate, zirconium complex of hydroxyethyl glycine, ammonium zirconium fluoride, zirconium 2-ethylhexanoate, zirconium acetate, zirconium tartarate, zirconium malonate, zirconium propionate, zirconium neodecanoate, zirconium acetylacetonate, tetrakis (triethanolamine)zirconate, zirconium carbonate, ammonium zirconium carbonate, zirconyl ammonium carbonate, zirconium lactate, titanium acetylacetonate, titanium ethylacetoacetate, titanium citrate, titanium triethanolamine, ammonium titanium lactate, aluminum citrate, chromium nitrate, chromium chloride, chromium citrate, chromium acetate, chromium propionate, or combinations of any two or more thereof. The presently most preferred crosslinking agent is chromium chloride, chromium propionate, chromium acetate, zirconium lactate, zirconium citrate, tetrakis (triethanolamine)zirconate, zirconium complex of hydroxyethyl glycine, zirconium tartarate, zirconium malonate, zirconium propionate, or combinations of any two or more thereof. These compounds are commercially available.

According to the present invention, the crosslinking agent can also contain a complexing ligand if necessary to further delay the rate of gelation so that the composition can reach the desired locations in a subterranean formation before it completes gelation. The complexing ligand useful for the present invention to retard the rate of gelation is generally a carboxylic acid containing one or more hydroxyl groups and salts thereof. The complexing ligand can also be an amine that has more than one functional group and contains one or more hydroxyl groups and that can chelate the zirconium or titanium moiety of the zirconium or titanium compounds described above. Examples of suitable complexing ligands include, but are not limited to, hydroxyethyl glycine, acetic acid, sodium acetate, ammonium acetate, potassium acetate, lactic acid, ammonium lactate, sodium lactate, potassium lactate, citric acid, ammonium citrate, potassium citrate, sodium citrate, isocitric acid, ammonium isocitrate, potassium isocitrate, sodium isocitrate, malic acid, ammonium malate, potassium malate, sodium malate, tartaric acid, ammonium tartarate, potassium tartarate, sodium tartrate, triethanolamine, malonic acid, ammonium malonate, potassium malonate, sodium malonate, and combinations of any two or more thereof. The presently preferred complexing ligands are citric acid, lactic acid, tartaric acid and salts thereof, triethanolamine, and hydroxyethyl glycine because of their ready availability and low cost.

The concentration or amount of the carboxylate-containing polymer in the gelling composition can range widely and be as suitable and convenient for the various polymers, and for the degree of gelation needed for a particular formation condition. Generally, the concentration of polymer in an aqueous solution is made up to a convenient strength of about 100 to 100,000 mg/l (ppm), preferably about 200 to 70,000 ppm, and most preferably 1,000 to 50,000 ppm.

Any suitable procedures for preparing an aqueous admixture of the gellable polymer can be used. Some of the polymers can require particular mixing conditions, such as slow addition of finely powdered polymer into a vortex of stirred brine, alcohol prewetting, protection from air (oxygen), preparation of stock solutions from fresh rather than salt water, as is known for such polymers.

The concentration of crosslinking agent used in the present invention depends largely on the desired gelation time. It can also depend on the concentrations of polymer in the composition, on the operation conditions, or the depth of the desired location in a formation. For example, if it is desirable for a gelling mixture to gel in 2 hours, the concentration of a crosslinking agent should be higher than that for gelation to complete in 4 hours. Furthermore, it has been found that for a given concentration of polymer, increasing the concentration of crosslinking agent generally substantially increases the rate of gelation. The concentration of crosslinking agent in the injected slug varies generally over the broad range of about 1 mg/l (ppm) to about 20,000 ppm, preferably over the range of about 1 ppm to about 10,000 ppm, and most preferably 1 ppm to 5,000 ppm.

The concentration of the complexing ligand, if present, in the composition also depends on the concentrations of the water-soluble polymer in the composition and on the desired rate of gelation. Generally, the lower the concentration of the complexing ligand is, the faster the gelation rate is.

The liquid component generally makes up the rest of the composition of the invention. According to the present invention, the term "liquid" used herein is interchangeable with "water" and generically refers to, unless otherwise indicated, pure water, regular tap water, a solution or suspension wherein the solution or suspension contain a variety of salts. A produced brine which is defined as the brine co-produced with oil or gas, or both is a liquid that can be used. A produced brine generally is a hard brine, i.e., containing at least 1,000 ppm of $Ca^{+2}$, $Ba^{+2}$, $Mg^{+2}$, or $Sr^{+2}$, or combinations of two or more thereof. A produced brine generally contains high salinity of from about 1 weight% to about 30% total dissolved solids. A produced brine generally is contaminated with oil or gas, or both. The gellable polymer generally gels well in produced brines having a salinity of from about 0.3% to about 27%.

The composition of the present invention, before it is injected into a subterranean formation, can be an aqueous solution, a suspension comprising undissolved solids, gas, or oil, or combinations of two or more thereof. Upon mixing the components of the composition, the composition can be substantially gelless, microgels, bulk gels, or combinations of any two or more thereof, which can be flowing or can travel to a desired location in a subterranean formation. However, once the composition completes gelation, the composition becomes nonflowable gels.

According to the present invention, the composition of the present invention can contain total solids (dissolved and undissolved) in the range of from about 30 weight %, preferably about 40 weight %, more preferably about 50 weight %, and most preferably 55 weight %, to about 90 weight %. The density of the composition can be in the range of from about 1 to about 3.5, preferably about 1.5 to about 3 or about 2 to about 3, and most preferably about 2.5 to 3 g/ml.

According to the second embodiment of the present invention, a composition comprising, consisting essentially of, or consisting of a clay, a crosslinking agent, a gellable polymer, a liquid, and optionally a weighting agent is injected into a subterranean formation. The definition and scope of clay, weighting agent, crosslinking agent, polymer, and liquid are the same as those described above. The amount of the composition injected can vary widely depending on the treatment required or desired. Generally, the process, i.e, the injection of the composition, is carried out when there is any sign of drilling fluid loss during drilling operation for preventing drilling fluid loss; or when there is an increase in fluid or gas pressure in the drill stem for treating an unstable matrix in a subterranean formation; or there is an increase in unconsolidated sediments as shown by a higher rate of unconsolidated sediment production.

The nature of the underground formation is not critical to the practice of the process of the present invention. The described composition can be injected into a formation having a temperature range of from about 35° F. to about 300° F. when the polymer used is a gelling copolymer suitable for the brine used at the reservoir temperature or temperatures in the range of from about 35° F. to about 300° F. for partially hydrolyzed polyacrylamide, xanthan gum, CMC, or CMHEC, or combination of any two or more thereof. However, for maintaining the integrity of the unconsolidated marine sediments, the temperature is preferably about 35° F. to about 125° F., preferably about 35° F. to about 75 ° F., more preferably about 35° F. to about 65° F., and most preferably to 60° F. Any means known to one skilled in the art such as, for example, pumps, can be used for injecting the composition and polymer solution.

Examples provided hereinbelow are intended to assist one skilled in the art to further understand the invention and should not be considered limitative.

EXAMPLE I

The purpose of this example is to illustrate the gelation of a composition comprising a water-soluble polymer, a crosslinking agent, and a brine, and to use this example as a control.

Polyacrylamide solutions (2 weight %) were prepared by mixing sufficient amount of the polymer in a brine containing 26 weight % NaCl. Then 20 ml samples of each polymer solution were placed in three vials. Each vial was then charged with a crosslinking agent. The vials were placed upright in test tube racks and then placed in ovens heated to and held at 130° F. Periodically, the vials were removed from the oven and the mechanical strength of the gels was determined.

As crosslinking developed, small microgels of granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each vial horizontally allowing the gelling composition to flow to its equilibrium position and then measuring the length of the tongue formed. As gelation progressed with time, stronger gels and shorter tongue lengths were developed. The gel strength is expressed mathematically as Percent Gel Strength=(AL-TL)×100/AL where AL equals ampule length (22.5 centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0.

First, the use of chromium propionate and chromium acetate to crosslink "ALCOFLOOD 254S" (obtained from Allied Colloids, Inc., Suffolk, Va., having ≦4% hydrolysis) was evaluated with a low molecular weight (300,000 to 500,000) polyacrylamide, dissolved in saturated sodium chloride solution at various pH levels. In general, the rate of gelation with chromium acetate is higher than that with chromium propionate. FIG. 1 shows a plot of 2.0% "ALCOFLOOD 254S" in 26% NaCl solution without pH adjustment (pH=6.7) with varying levels of chromium propionate concentrations. It is clear from this plot that the rate of gelation was a function of Cr(III) concentration. However, the gel made with only 100 ppm Cr level, was weak and degraded within a month of aging. The gels produced with 250 and 500 ppm Cr have survived for about 100 days of aging at 130° F. FIG.'s 2 and 3 show similar results for the gelation of 2.0% "ALCOFLOOD 254S" in 26% NaCl solutions with pH adjustments at 9.0 and 10.5

Figure 4:
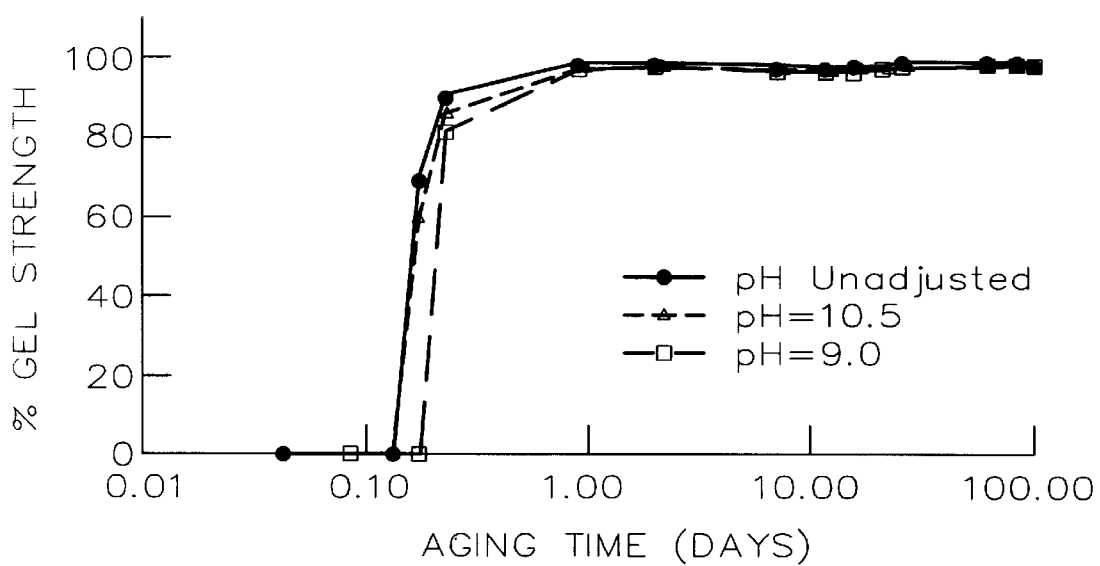
FIG. 4 illustrates the effect of pH on the rate of stability of gels produced.

FIG. 4 summarizes the effect of pH on the rate and stability of gels produced with 2.0% "ALCOFLOOD 254S" and 250 ppm Cr(III) in 26.0% NaCl solutions of three pH levels. These results indicate a small dependence of gel properties in the pH range of 6.7 (unadjusted) to 10.5.

Figure 5:
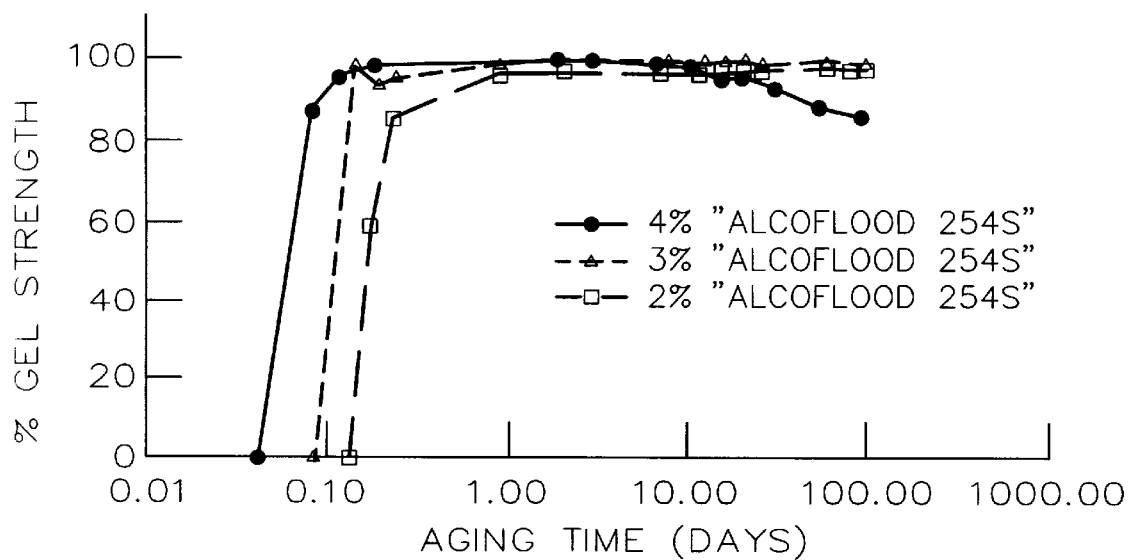
FIG. 5 shows gel strength as a function of aging time for 2 to 4 weight % polymer in a gelling composition.

FIG. 5 shows a plot of gel strength versus aging time for solutions of "ALCOFLOOD 254S" at various concentrations in 26.0% NaCl solutions (pH=10.5) with chromium propionate (250 ppm Cr). The rate of gelation was faster with higher polymer levels. A small drop in gel strength with additional aging for the gels prepared with 4% polymer was unexpected.

Core tests was also performed with 2.0% "ALCOFLOOD 254S" in 26.0% NaCl solution (pH=10.5) and chromium propionate (500 ppm Cr). Berea core plugs (obtained from Cleveland Quarries, Amherst, Ohio) 12.7 to 14.9 cm in length and 2.54 cm in diameter were treated with about 10–16 pore volumes of the gelling solution at 130° F. The cores used in these tests varied in permeability of water from 277 mD to 669 mD. Following the injection of the gelling solution, each core was shut in for sufficient length of time for the gels to set before it was subjected to a flow of nitrogen in the opposite direction in which the gelling solution was injected. The first core which was shut in for 24 hours, required 1000 psi of nitrogen to break through. The second core which was shut in for 2 hours, required 85 psi of nitrogen to break through. The third core which was shut in for 3 hours required 340 psi of nitrogen while the fourth core which was shut in for 4 hours, did not break through, even though the differential pressure reached 2000 psi.

EXAMPLE II

This is a simulated example illustrating the process for stabilizing unconsolidated sand in a seabed. The process was carried out by placing a 250 ml sample of a base fluid (such as tap water, 2% KCl, sea water or combinations thereof) into a blender. The pH of the blended fluid was adjusted, if needed, using dilute HCl or NaOH. Thereafter, proper amount of polymer was added to the fluid and stirred until dissolved.

A 10 ml sample of the test fluid was removed, using a syringe, and placed into a glass vial (15 mm by 135 mm), having a threaded cap. A proper amount of a crosslinking was added in the form of a dilute aqueous solution. The cap was placed onto the vial, the same was shaken, and then the vial was placed into a rack. The samples were either stored on a lab bench (75° F.), placed into an oven (100° F.), or placed into a chilled water bath (40°–50° F.). Measurement of gel strength were made periodically to determine the progress of the gelation process. The gel strength was measured using the formula described in Example I.

The data shown in Table I demonstrate the practicality of controlling gel time by varying polymer concentration for a molecular weight of about 3 million polyacrylamide having 10% hydrolysis. Table I also shows that gelation completed (100% gel strength) in as short as 30 minutes at a low temperature of 75° F.

TABLE I[a]

| | | 2% KCl + Polyacrylamide Temp = 75° F. | | | | | | | | |
|---|---|---|---|---|---|---|---|---|---|---|
| Polymer | $Cr^{+3}$ (ppm) | Percent Gel Strength | | | | | | | | |
| 1% | 100 | 0% | 0% | 0% | 0% | 0% | 0% | 23% | 77% | 100% |
|  | 600 | 0% | 0% | 0% | 0% | 0% | 0% | 0% | 0% | 100% |
| 2% | 100 | 0% | 0% | 0% | 54% | 88% | 97% | 100% | 100% | 100% |
|  | 600 | 0% | 0% | 0% | 23% | 85% | 98% | 100% | 100% | 100% |
| 3% | 100 | 0% | 94% | 100% | 100% | 100% | 100% | 100% | 100% | 100% |
|  | 600 | 0% | 95% | 100% | 100% | 100% | 100% | 100% | 100% | 100% |
|  | Minutes = | 10 | 20 | 30 | 40 | 60 | 80 | 180 | 300 | 24 hours |

[a]The $Cr^{+3}$ was supplied to solution as chromic chloride.
The polyacrylamide has a molecular weight in the range of 3 million, with 10% hydroiysis.

TABLE II[a]

2% KCl + Polyacrylamide
Temp = 50° F.

| Polymer | Cr$^{+3}$ (ppm) | Percent Gel Strength | | | | |
|---|---|---|---|---|---|---|
| 1% | 100 | 0% | 0% | 0% | 0% | 91% |
| | 600 | 0% | 0% | 0% | 0% | 85% |
| 2% | 100 | 0% | 0% | 62% | 100% | 100% |
| | 600 | 0% | 0% | 0% | 100% | 100% |
| 3% | 100 | 54% | 100% | 100% | 100% | 100% |
| | 600 | 56% | 100% | 100% | 100% | 100% |
| | Hours | 1 | 3 | 5 | 24 | 48 |

[a]See footnote a in Table I.

Table II represents results for a system similar to Table I conducted at lower temperature (50° F.). These results indicate a lower gelation rate at lower temperature.

The data in Table III below demonstrate the utility of controlling the gelation rate by limiting the availability of crosslinking sites (carboxylic acid groups). For this terpolymer of acrylamide, sodium acrylamide-2-acrylamido-2-methylpropane sulfonate, and sodium acrylate, reducing the acrylate groups (degree of hydrolysis) increased the delay in gelation.

TABLE III[a]

2% KCl + 0.72% Polymer
Test Temp = 75° F.

| Acrylate | Cr$^{+3}$ ppm | Percent Gel Strength | | | | | | | | |
|---|---|---|---|---|---|---|---|---|---|---|
| 0.5% | 100 | 0% | 0% | 0% | 0% | 0% | 0% | 0% | 0% | 24% |
| | 600 | 0% | 0% | 0% | 0% | 0% | 0% | 0% | 0% | 32% |
| 1.0% | 100 | 0% | 0% | 0% | 0% | 0% | 0% | 0% | 32% | 48% |
| | 600 | 0% | 0% | 0% | 0% | 0% | 0% | 0% | 0% | % |
| 2.5% | 100 | 0% | 0% | 0% | 0% | 0% | 38% | 69% | 72% | 80% |
| | 600 | 0% | 0% | 0% | 0% | 0% | 16% | 40% | 40% | 62% |
| 5.0% | 100 | 0% | 0% | 0% | 24% | 40% | 79% | 87% | 87% | 100% |
| | 600 | 0% | 0% | 0% | 0% | 0% | 31% | 69% | 72% | 75% |
| 10% | 100 | 0% | 48% | 63% | 87% | 87% | 97% | 100% | 100% | 100% |
| | 600 | 0% | 0% | 0% | 67% | 67% | 98% | 100% | 100% | 10% |
| | Hours = | 0.5 | 1 | 2 | 4 | 5 | 24 | 4 days | 5 days | 8 days |

[a]The Cr$^{+3}$ was supplied to solution either as the salt (chromic chloride), or complexed with a carboxylic acid (chrome propionate). These polymers were made under similar conditions. They are terpolymers of acrylamide, sodium 2-acrylamido-2-methylpropane sulfonate (50 mole %), and sodium acrylate. The sodium acrylate content was varied to simulate controlled degrees of acrylamide hydrolysis.

Table IV demonstrates using a metal salt for rapid gelation, as required for drilling purposes, and metal complexes for very slow gelation, as required for in-depth consolidation of unconsolidated marine sediments where deep penetration of the treating fluid is necessary.

TABLE IV[a]

2% KCl + 0.72% Terpolymer
Test Temp = 75° F.

| % Hydrolysis | Cr$^{+3}$ ppm | CrCl$_3$ | Chrome Propionate | | | | | | | | | |
|---|---|---|---|---|---|---|---|---|---|---|---|---|
| 2.5% | 100 | Yes | — | 0% | 0% | 0% | 0% | 0% | 38% | 69% | 72% | 80% | 69% |
| | 600 | Yes | — | 0% | 0% | 0% | 0% | 0% | 16% | 40% | 40% | 62% | 63% |
| | 100 | — | Yes | 0% | 0% | 0% | 0% | 0% | 0% | 0% | 8% | 72% | 88% |
| | 600 | — | Yes | 0% | 0% | 0% | 0% | 0% | 0% | 31% | 54% | 62% | 77% |
| 5% | 100 | Yes | — | 0% | 0% | 0% | 24% | 40% | 79% | 87% | 87% | 100% | 100% |
| | 600 | Yes | — | 0% | 0% | 0% | 0% | 0% | 31% | 69% | 72% | 75% | 100% |
| | 100 | — | Yes | 0% | 0% | 0% | 0% | 0% | 24% | 56% | 65% | 73% | 100% |
| | 600 | — | Yes | 0% | 0% | 0% | 0% | 0% | 0% | 63% | 71% | 83% | 100% |
| 10% | 100 | Yes | — | 0% | 48% | 63% | 87% | 87% | 97% | 100% | 100% | 100% | 100% |
| | 600 | Yes | — | 0% | 0% | 0% | 67% | 67% | 98% | 100% | 100% | 100% | 100% |

TABLE IV[a]-continued

| | | | | 2% KCl + 0.72% Terpolymer Test Temp = 75° F. | | | | | | | | | |
|---|---|---|---|---|---|---|---|---|---|---|---|---|---|
| % Hydrolysis | $Cr^{+3}$ ppm | $CrCl_3$ | Chrome Propionate | | | | | | | | | | |
| | 100 | — | Yes | 0% | 0% | 0% | 0% | 0% | 40% | 71% | 75% | 87% | 100% |
| | 600 | — | Yes | 0% | 0% | 0% | 0% | 0% | 74% | 90% | 100% | 100% | 100% |
| | | | Hours = | 0.5 | 1 | 2 | 4 | 5 | 24 | 4 days | 5 days | 8 days | 26 days |

[a]The $Cr^{+3}$ was supplied to solution either as the salt (chromic chloride), or complexed with a carboxylic acid (chrome propionate). These polymers were made under similar conditions. They are terpolymers of acrylamide, sodium 2-acrylamido-2-methylpropane sulfonate (50 mole %), and sodium acrylate. The sodium acrylate content was varied to simulate controlled degrees of acrylamide hydrolysis.

The data in Table V also demonstrate using a metal salt for rapid gelation, as required for drilling purposes, and metal complexes for very slow gelation, as required for in-depth consolidation of unconsolidated marine sediments where deep penetration of the treating fluid is necessary.

TABLE V[a]

| | | | Synthetic Sea Water + 1.5% Carboxymethyl Cellulose (CMC) Test Temp = 40° F. | | | | | |
|---|---|---|---|---|---|---|---|---|
| $Cr^{+3}$ | $CrCl_3$ lb/bbl | Chrome Acetate lb/bbl | Percent Gel Strength | | | | | |
| 100 | 0.2 | — | 100% | 100% | 100% | 100% | 100% | 100% |
| 300 | 0.5 | — | 100% | 100% | 100% | 100% | 100% | 100% |
| 600 | 1 | — | 100% | 100% | 100% | 100% | 100% | 100% |
| 100 | — | 0.2 | 0% | 0% | 0% | 0% | 24% | 32% |
| 300 | — | 0.5 | 0% | 0% | 0% | 0% | 79% | 100% |
| 600 | — | 1 | 0% | 0% | 24% | 63% | 100% | 100% |
| | | Hours = | 2 | — | — | — | — | — |
| | | Days = | — | 2 | 3 | 4 | 6 | 10 |

[a]The $Cr^{+3}$ was supplied to solution either as the salt (chromic chloride), or complexed with a carboxylic acid (chrome acetate).
The chromic chloride samples crosslinked within 5 minutes.
The CMC has a molecular weight of about 500,000 with a degree of substitution of about 1.2

The results shown in the above examples indicate that for lower molecular weight polymers (<1,000,000) the degree of hydrolysis can be from 0.1 to about 10% to produce acceptable gels with a crosslinking agent. For higher molecular weight polymers (>1,000,000) a low degree of hydrolysis is preferred.

EXAMPLE III

This example illustrates a mud gel composition which comprises a clay, a liquid, and a gelling mixture.

Mud gels for fracture treatments were prepared out by using a typical drilling mud. Table VI below shows the composition of the drilling mud used to form the mud gels.

TABLE VI

| Component of Mud Gel | |
|---|---|
| Component | Amount (g) |
| Bartlesville, Oklahoma Tap Water | 195.00 |
| Bentonite | 8.00 |
| NaCl | 49.40 |
| "ALCOFLOOD 254S" | 5.72 |
| Barite | 325.00 |

Figure 6:
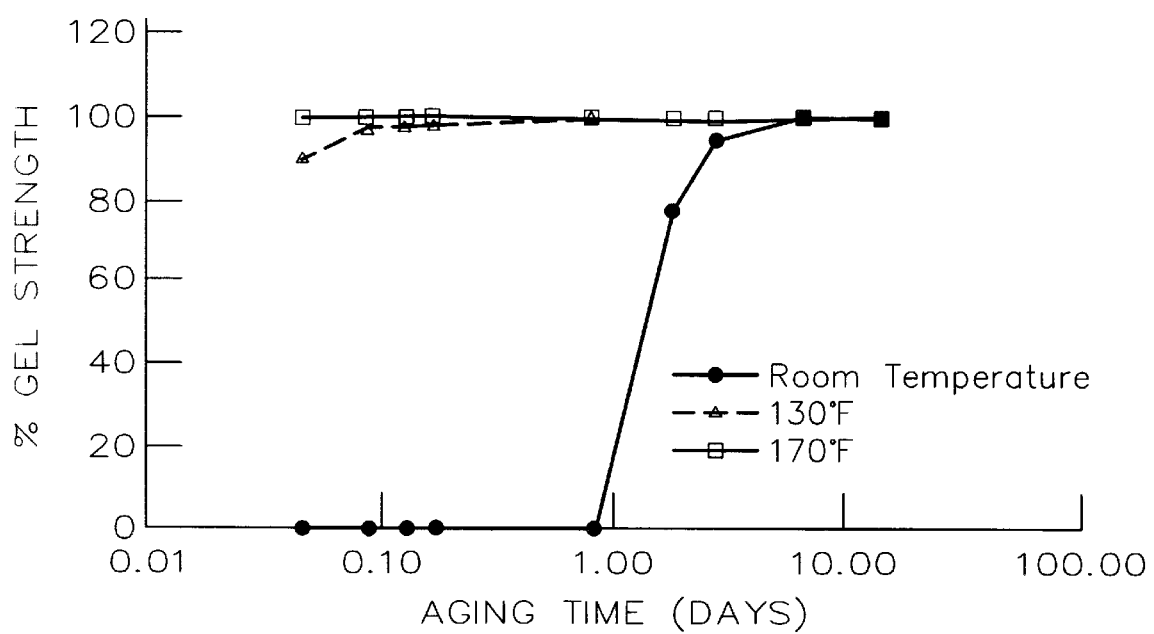
FIG. 6 illustrates gel strength of mud gel versus aging time.
Figure 7:
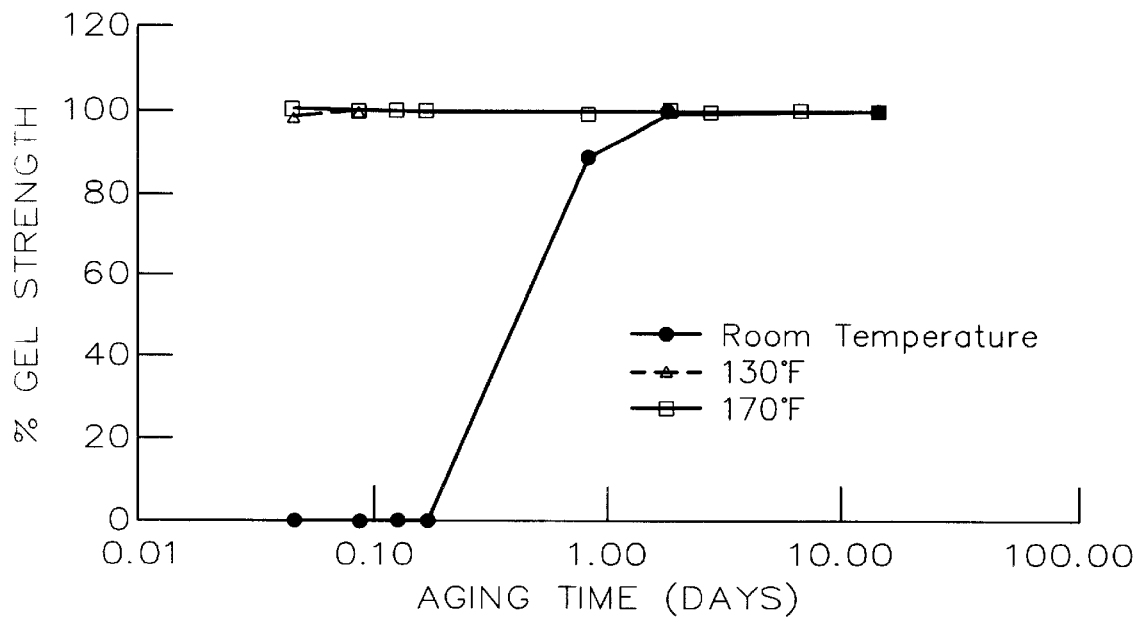
FIG. 7 shows the gel strength of a mud gel formed using chromium acetate as a crosslinking agent.
Figure 8:
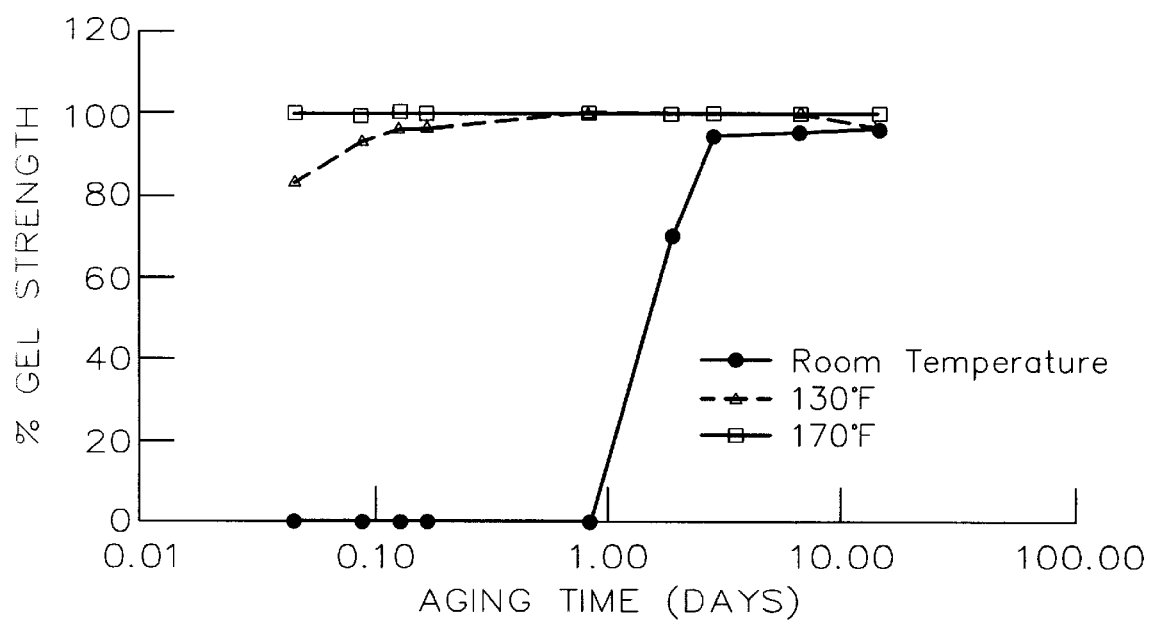
FIG. 8 also illustrates the gel strength of a mud gel formed using chromium propionate.
Figure 9:
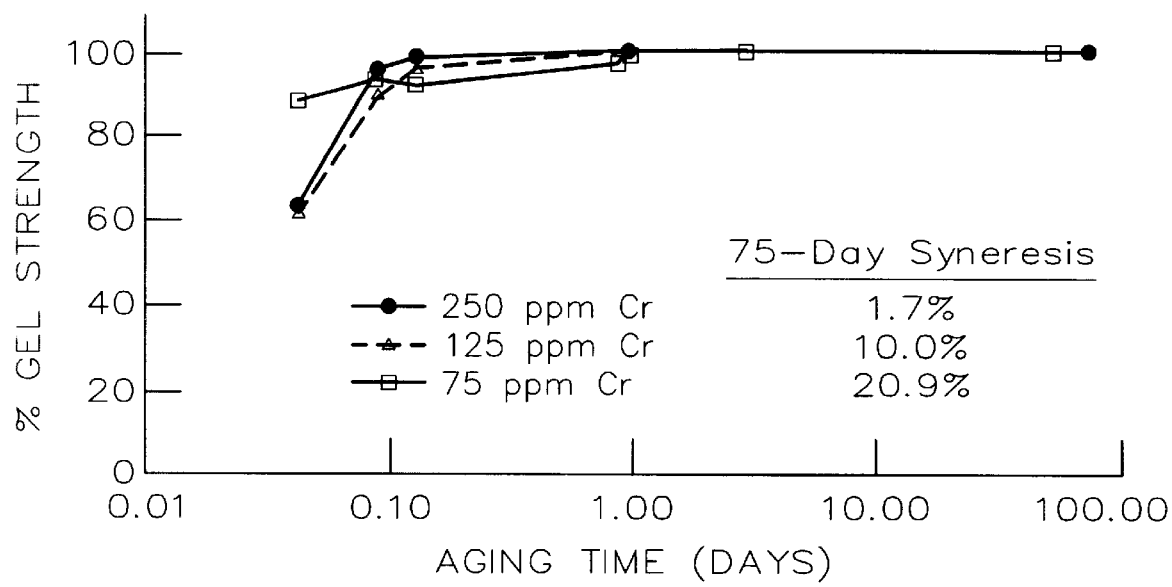
FIG. 9 illustrates gel strength of mud gels formed using chromium propionate at different chromium concentrations.
Figure 10:
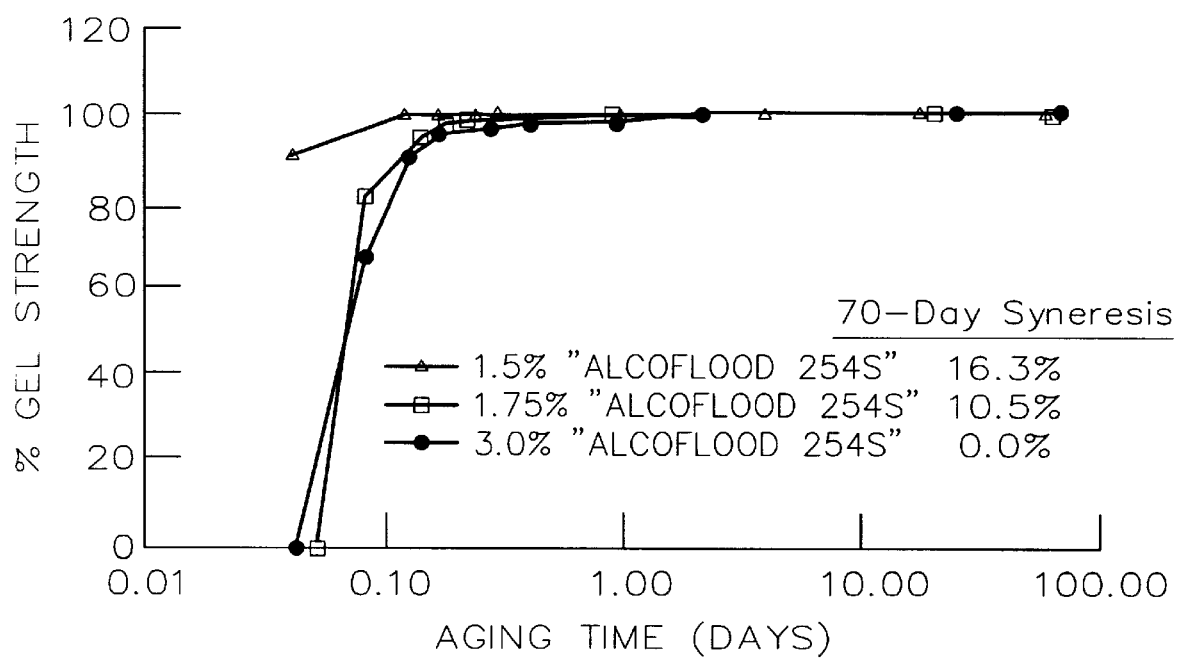
FIG. 10 illustrates gelation of 17.3 pounds per gallon of a drilling mud with varying amount of polymer and 500 ppm by weight of chromium as chromium propionate.

Addition of "ALCOFLOOD 254S" was the last step in preparation of the mud. The mud was allowed to age over night (16 hours) at 130° F. to make sure complete hydration of the polymer, before addition of a chromium-containing crosslinking agent. The aging can be as short as about 5 minutes, preferably about 10 minutes, and most preferably 1 hour, and can be as long as about 30 hours, preferably about 25 hours, and most preferably about 20 hours. After adding sufficient amount of crosslinking agent and proper mixing, 20 ml aliquot samples of this gelling mud were placed in vials and aged at room temperature as well as 130° F. and 170° F. At various time intervals, tongue length of the mud gel was measured. FIG. 6 shows a plot of gel strength versus time for a mud gel made with chromium propionate (494 ppm Cr) at these temperatures. While the rate of gelation at 130° F. and 170° F. was fairly fast, the rate of gelation at room temperature was slow. This system required over one day of aging to produce a measurable gel at room temperature. FIG. 7 shows a similar plot for the mud gels produced with chromium acetate under similar conditions. Comparing FIGS. 6 and 7 show that the rate of gelation was faster with chromium acetate than chromium propionate under identical conditions. FIG. 8 shows a plot of gel strength versus time for the mud gels produced with chromium propionate at 247 ppm chromium (from chromium propionate) at three temperatures. The rate of gelation was slightly lower than the mud gels made with chromium propionate at 494 ppm Cr(III) level. FIG. 9 shows a similar plot for the mud gels made with chromium propionate at 75 ppm, 125 ppm and 250 ppm Cr(III). As this plot indicates, syneresis of these gels was related to the amount of Cr concentration. FIG. 10 shows a plot of gel strength versus aging time at 130° F. for the mud gels produced with chromium propionate at 500 ppm Cr(III) and 1.5% to 3.0% "ALCOFLOOD 254S". This plot shows the dependence of gel syneresis on the amount of polymer present. The mud gels produced in this study, were rubbery gels with higher strengths as the polymer content increased. However, the viscosity of the gelling mud before setting also increases with polymer content and might be the limiting factor for the higher concentrations. To produce a mud gel with sufficient strength and stability, proper amount of polymer and crosslinking agent level had to be used.

Several core tests were performed to block induced fractures in Berea cores. Berea cores (length: 6", diameter: 1") were split along their lengths and put back together with a spacer material laid along the edges on both sides. The fracture was then glued together with epoxy resin. The fracture widths for these tests ranged between 0.5 mm to 0.8 mm. Each core was placed in core holder after the resin was cured. The core was then saturated with 26% NaCl solution and its permeability measured. The core was then heated to 130° F. About 150–200 ml of a gelling mud solution containing 2.0% (by volume) of "ALCOFLOOD 254S" and chromium propionate at 500 ppm Cr was injected into the core. Sample of the core effluents and the injected solutions aged at 130° F. produced good mud gels. The core tests were performed in cores where 28 gauge copper wires were used as the spacer. Beaker tests performed with placing strips of different materials in gelling mud solutions prior to aging showed that copper wire was not a good choice as the mud gel did not adhere to it. While other metallic strips initially adhered to the mud gel, they did lose their adhesion with additional aging. Strips of "Teflon®" and "Marlex®" adhered well to the mud gel. A piece of Berea core placed in the gelling mud solution also adhered very strongly to the mud gel. These results indicate that the resulting mud gels blocked the fractures.

The results shown in the above examples also clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed is:

1. A composition comprising a clay, a polymer, a crosslinking agent, and a liquid wherein said clay, polymer, crosslinking agent, and liquid are each present in said composition in an amount effective to form a gel; and said composition contains a total solids (dissolved and undissolved) in the range of from about 30 to about 90 weight %.

2. A composition according to claim 1 further comprising a weighting agent.

3. A composition according to claim 1 wherein said clay is selected from the group consisting of kaolinite, halloysite, vermiculite, chlorite, attapulgite, smectite, montmorillonite, illite, saconite, sepiolite, palygorskite. Fuller's earth, and combinations of any two or more thereof.

4. A composition according to claim 1 wherein said clay is bentonite.

5. A composition according to claim 1 wherein said polymer is selected from the group consisting of biopolysaccharides, cellulose ethers, acrylamide-containing polymers, copolymers of acrylate and styrene sulfonate, partially hydrolyzed polyacrylonitrile, polyacrylate, and combinations of any two or more thereof.

6. A composition according to claim 1 wherein said polymer contains an effective mole % of carboxylate groups for crosslinking with said crosslinking agent and is selected from the group consisting of polyacrylamide, partially hydrolyzed polyacrylamides, copolymers of acrylamide and N-vinyl-2-pyrrolidone, copolymers of acrylamide, acrylate, and N-vinyl-2-pyrrolidone, copolymers of acrylate and styrene sulfonate, copolymers of acrylamide and sodium 2-acrylamido-2-methylpropane sulfonate, copolymers of acrylamide, acrylate, and sodium 2-acrylamido-2-methylpropane sulfonate, copolymers of acrylamide, N-vinyl-2-pyrrolidone, and sodium 2-acrylamido-2-methylpropane sulfonate, copolymers of acrylamide, acrylate, N-vinyl-2-pyrrolidone, and sodium 2-acrylamido-2-methylpropane sulfonate, copolymers of acrylamide, sodium acrylate, and sodium 2-acrylamido-2-methylpropane sulfonate, carboxymethyl cellulose, carboxymethylhydroxyethyl cellulose, xanthan gum, and combinations of any two or more thereof.

7. A composition according to claim 1 wherein said polymer contains a carboxylate group in the range of from about 0.01 to about 30 mole %.

8. A composition according to claim 1 wherein said polymer contains a carboxylate group in the range of from about 0.1 to about 10.0 mole %.

9. A composition according to claim 1 wherein said composition is prepared by combining said clay, said polymer, said crosslinking agent, and said liquid.

10. A composition according to claim 2 wherein said weighting agent is selected from the group consisting of barite, hematite, calcium carbonate, galena, and combinations of any two or more thereof.

11. A composition according to claim 1 wherein the gelation time of said composition is less than about 6 hours.

12. A composition according to claim 1 wherein the gelation time of said composition is less than about 3 hours.

13. A composition according to claim 2 wherein the density of said composition is in the range of from about 1 to about 3.5 g/ml.

14. A composition according to claim 2 wherein the density of said composition is in the range of from about 2.2 to about 3.0 g/ml.

15. A composition comprising:

a clay selected from the group consisting of kaolinite, halloysite, vermiculite, chlorite, attapulgite, smectite, montmorillonite, illite, saconite, sepiolite, palygorskite. Fuller's earth, and combinations of any two or more thereof;

a carboxylate-containing polymer having a molecular weight in the range of from about 10,000 to about 30,000,000 selected from the group consisting of biopolysaccharides, cellulose ethers, acrylamide-containing polymers, copolymers of acrylate and styrene sulfonate, partially hydrolyzed polyacrylonitrile, and combinations of any two or more thereof;

a crosslinking agent selected from the group consisting of zirconium complex of hydroxyethyl glycine, ammonium zirconium fluoride, zirconium 2-ethylhexanoate, zirconium acetate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, zirconium tartarate, zirconium malonate, zirconium propionate, titanium acetylacetonate, titanium ethylacetoacetate, titanium citrate, titanium triethanolamine, ammonium titanium lactate, aluminum citrate, and combinations of any two or more thereof; and a liquid; wherein said polymer is present in said composition in the range of from about 100 to about 100,000 mg/l and said crosslinking agent is present in said composition in the range of from about 1 to about 5,000 mg/l.

16. A composition according to claim 15 wherein said polymer is selected from the group consisting of partially hydrolyzed polyacrylamides, copolymers of acrylamide and N-vinyl-2-pyrrolidone, copolymers of acrylamide, acrylate, and N-vinyl-2-pyrrolidone, copolymers of acrylate and styrene sulfonate, copolymers of acrylamide and sodium 2-acrylamido-2-methylpropane sulfonate, copolymers of acrylamide, acrylate, and sodium 2-acrylamido-2-methylpropane sulfonate, copolymers of acrylamide, N-vinyl-2-pyrrolidone, and sodium 2-acrylamido-2-methylpropane sulfonate, copolymers of acrylamide, acrylate, N-vinyl-2-pyrrolidone, and sodium 2-acrylamido-2-methylpropane sulfonate, copolymers of acrylamide, sodium acrylate, and sodium 2-acrylamido-2-methylpropane sulfonate, carboxymethyl cellulose, carboxymethylhydroxyethyl cellulose, xanthan gum, and combinations of any two or more thereof; said polymer has a molecular weight in the range of from 10,000 to 20,000,000, contains a carboxylate group in the range of from about 0.1 to about 10 mole %, and is present in said composition in the range of from 1,000 to 50,000 mg/l; and said crosslinking agent is selected from the group consisting of chromium acetate, chromium propionate, chromium chloride, chromium nitrate, and combinations thereof and is present in said composition in the range of from 1 to 2,000 mg/l.

17. A composition according to claim 16 wherein said polymer is selected from the group consisting of partially hydrolyzed polyacrylamides, copolymers of acrylamide, sodium acrylate, and sodium 2-acrylamido-2-methylpropane sulfonate, and combinations of any two or more thereof; and said crosslinking agent is zirconium lactate.

18. A process comprising injecting a mud gel composition into a subterranean formation wherein said composition comprises a clay, a polymer, a crosslinking agent, and a liquid; said clay, polymer, crosslinking agent, and liquid are each present in an amount effective to form a gel; and said composition contains a total solids (dissolved and undissolved) in the range of from about 30 to about 90 weight %.

19. A process according to claim 18 wherein said composition further comprises a weighting agent.

20. A process according to claim 18 wherein said clay is selected from the group consisting of kaolinite, halloysite, vermiculite, chlorite, attapulgite, smectite, montmorillonite, illite, saconite, sepiolite, palygorskite. Fuller's earth, and combinations of any two or more thereof.

21. A process according to claim 20 wherein said polymer is selected from the group consisting of biopolysaccharides, cellulose ethers, acrylamide-containing polymers, copolymers of acrylate and styrene sulfonate, partially hydrolyzed polyacrylonitrile, polyacrylate, and combinations of any two or more thereof.

22. A process according to claim 19 wherein said weighting agent is selected from the group consisting of barite, hematite, calcium carbonate, galena, and combinations of any two or more thereof.

23. A process according to claim 19 wherein the density of said composition is in the range of from about 1 to about 3.5 g/ml.

24. A process according to claim 19 wherein said composition is prepared by combining said clay, said polymer, said crosslinking agent, said weighting agent, and said liquid.

25. A process comprising injecting a mud gel composition into a subterranean formation at the sight of a loss of circulation or an increase in fluid or gas pressure in a drill stem wherein said composition comprises:

a clay selected from the group consisting of kaolinite, halloysite, vermiculite, chlorite, attapulgite, smectite, montmorillonite, illite, saconite, sepiolite, palygorskite. Fuller's earth, and combinations of any two or more thereof;

a carboxylate-containing polymer having a molecular weight in the range of from about 10,000 to about 30,000,000 selected from the group consisting of biopolysaccharides, cellulose ethers, acrylamide-containing polymers, copolymers of acrylate and styrene sulfonate, partially hydrolyzed polyacrylonitrile, and combinations of any two or more thereof;

a crosslinking agent selected from the group consisting of zirconium complex of hydroxyethyl glycine, ammonium zirconium fluoride, zirconium 2-ethylhexanoate, zirconium acetate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, zirconium tartarate, zirconium malonate, zirconium propionate, titanium acetylacetonate, titanium ethylacetoacetate, titanium citrate, titanium triethanolamine, ammonium titanium lactate, aluminum citrate, and combinations of any two or more thereof; and a liquid; wherein said polymer is present in said composition in the range of from about 100 to about 100,000 mg/l and said crosslinking agent is present in said composition in the range of from about 1 to about 5,000 mg/l.

26. A process according to claim 25 wherein said polymer is selected from the group consisting of partially hydrolyzed polyacrylamides, copolymers of acrylamide and N-vinyl-2-pyrrolidone, copolymers of acrylamide, acrylate, and N-vinyl-2-pyrrolidone, copolymers of acrylate and styrene sulfonate, copolymers of acrylamide and sodium 2-acrylamido-2-methylpropane sulfonate, copolymers of acrylamide, acrylate, and sodium 2-acrylamido-2-methylpropane sulfonate, copolymers of acrylamide, N-vinyl-2-pyrrolidone, and sodium 2-acrylamido-2-methylpropane sulfonate, copolymers of acrylamide, acrylate, N-vinyl-2-pyrrolidone, and sodium 2-acrylamido-2-methylpropane sulfonate, copolymers of acrylamide, sodium acrylate, and sodium 2-acrylamido-2-methylpropane sulfonate, carboxymethyl cellulose, carboxymethylhydroxyethyl cellulose, xanthan gum, and combinations of any two or more thereof; said polymer has a molecular weight in the range of from 10,000 to 20,000,000, contains a carboxylate group in the range of from about 0.1 to about 10 mole %, and is present in said composition in the range of from 1,000 to 50,000 mg/l; and said crosslinking agent is selected from the group consisting of chromium acetate, chromium propionate, chromium chloride, chromium nitrate, and combinations thereof and is present in said composition in the range of from 1 to 2,000 mg/l.

27. A process according to claim 26 wherein said polymer is selected from the group consisting of partially hydrolyzed polyacrylamides, copolymers of acrylamide, sodium acrylate, and sodium 2-acrylamido-2-methylpropane sulfonate, and combinations of any two or more thereof; and said crosslinking agent is zirconium lactate.

28. A process comprising injecting a composition into a subterranean formation at the sight of an increase in unconsolidated sediments during drilling of said formation, wherein said composition is prepared by combining: (1) a polymer selected from the group consisting of partially hydrolyzed polyacrylamides, copolymers of acrylamide, sodium acrylate, and sodium 2-acrylamido-2-methylpropane sulfonate, and combinations of any two or more thereof wherein said polymer has a molecular weight in the range of from about 10,000 to about 30,000,000, has a carboxylate group in the range of from about 0.1 to about 30 mole %, and is present in said composition in the range of from 1,000 to 50,000 mg/l; (2) a crosslinking agent which is present in said composition in the range of from 1 to 2,000 mg/l; and (3) a liquid which makes up the rest of said composition; and said composition contains a total solids (dissolved and undissolved) in the range of from about 30 to about 90 weight %.

29. A composition comprising a clay, a polymer, a crosslinking agent, and a liquid wherein said clay, polymer, crosslinking agent, and liquid are each present in said composition in an amount effective to form a gel;

said crosslinking agent is selected from the group consisting of organic crosslinking agents, multivalent metallic compounds, and combinations of any two or more thereof; and said multivalent metallic compound is selected from the group consisting of zirconium complex of hydroxyethyl glycine, ammonium zirconium fluoride, zirconium 2-ethylhexanoate, zirconium acetate, zirconium decanoate, zirconium acetylacetonate, tetrakis(triethanolamine)zirconate, zirconium carbonate, ammonium zirconium carbonate, zirconyl ammonium carbonate, zirconium citrate, zirconium lactate, zirconium tartarate, zirconium malonate, zirconium propionate, titanium acetylacetonate, titanium ethylacetoacetate, titanium citrate, titanium triethanolamine, ammonium titanium lactate, aluminum citrate, and combinations of any two or more thereof.

30. A composition according to claim 29 further comprising a weighting agent.

31. A composition according to claim 29 wherein said clay is selected from the group consisting of kaolinite, halloysite, vermiculite, chlorite, attapulgite, smectite, montmorillonite, illite, saconite, sepiolite, palygorskite. Fuller's earth, and combinations of any two or more thereof.

32. A composition according to claim 29 wherein said clay is bentonite.

33. A composition according to claim 29 wherein said polymer is selected from the group consisting of biopolysaccharides, cellulose ethers, acrylamide-containing polymers, copolymers of acrylate and styrene sulfonate, partially hydrolyzed polyacrylonitrile, polyacrylate, and combinations of any two or more thereof.

34. A composition according to claim 29 wherein said polymer contains an effective mole % of carboxylate groups for crosslinking with said crosslinking agent and is selected from the group consisting of polyacrylamide, partially hydrolyzed polyacrylamides, copolymers of acrylamide and N-vinyl-2-pyrrolidone, copolymers of acrylamide, acrylate, and N-vinyl-2-pyrrolidone, copolymers of acrylate and styrene sulfonate, copolymers of acrylamide and sodium 2-acrylamido-2-methylpropane sulfonate, copolymers of acrylamide, acrylate, and sodium 2-acrylamido-2-methylpropane sulfonate, copolymers of acrylamide, N-vinyl-2-pyrrolidone, and sodium 2-acrylamido-2-methylpropane sulfonate, copolymers of acrylamide, acrylate, N-vinyl-2-pyrrolidone, and sodium 2-acrylamido-2-methylpropane sulfonate, copolymers of acrylamide, sodium acrylate, and sodium 2-acrylamido-2-methylpropane sulfonate, carboxymethyl cellulose, carboxymethylhydroxyethyl cellulose, xanthan gum, and combinations of any two or more thereof.

35. A composition according to claim 29 wherein said polymer contains a carboxylate group in the range of from about 0.01 to about 30 mole %.

36. A composition according to claim 29 wherein said composition is prepared by combining said clay, said polymer, said crosslinking agent, and said liquid.

37. A composition according to claim 30 wherein said weighting agent is selected from the group consisting of barite, hematite, calcium carbonate, galena, and combinations of any two or more thereof.

38. A composition according to claim 30 wherein the density of said composition is in the range of from about 1 to about 3.5 g/ml.

39. A composition according to claim 30 wherein said composition contains a total solids (dissolved and undissolved) in the range of from about 30 to about 90 weight %.

* * * * *